(12) United States Patent
Jeong et al.

(10) Patent No.: US 9,425,472 B2
(45) Date of Patent: Aug. 23, 2016

(54) APPARATUS FOR DIAGNOSING FAULT OF FUEL CELL STACK

(71) Applicants: Hyundai Motor Company, Seoul (KR); Hyundai Autron Co., Ltd., Seongnam, Gyeonggi-Do (KR)

(72) Inventors: Kwi Seong Jeong, Gyeonggi-do (KR); Young Bum Kum, Seoul (KR); Sae Hoon Kim, Gyeonggi-do (KR); Haengjin Ko, Seoul (KR); Young-Hyun Lee, Gyeonggi-do (KR); Uck-Soo Kim, Gyeonggi-do (KR); Hyun-Seok Park, Gyeonggi-do (KR)

(73) Assignees: Hyundai Motor Company, Seoul (KR); Kangnam University Industry-Academia Cooperation Foundation, Yongin, Gyeonggi-Do (KR); Hyundai Autron Co., Ltd., Seongnam, Gyeonggi-Do (KR)

( * ) Notice: Subject to any disclaimer, the term of this patent is extended or adjusted under 35 U.S.C. 154(b) by 358 days.

(21) Appl. No.: 14/102,663

(22) Filed: Dec. 11, 2013

(65) Prior Publication Data
US 2014/0162157 A1 Jun. 12, 2014

(30) Foreign Application Priority Data
Dec. 11, 2012 (KR) .................. 10-2012-0143882

(51) Int. Cl.
*H01M 8/04* (2016.01)

(52) U.S. Cl.
CPC ..... *H01M 8/04679* (2013.01); *H01M 8/04559* (2013.01); *H01M 8/04589* (2013.01); *H01M 2250/20* (2013.01); *Y02E 60/50* (2013.01); *Y02T 90/32* (2013.01)

(58) Field of Classification Search
CPC ............. H01M 8/04; H01M 8/04559; H01M 8/04589; H01M 8/04679; H01M 8/04686; H01M 8/04238; H01M 8/04358
See application file for complete search history.

(56) References Cited

U.S. PATENT DOCUMENTS

| | | | |
|---|---|---|---|
| 2003/0124400 A1* | 7/2003 | Hara ................. | H01M 8/04686 429/425 |
| 2003/0211372 A1* | 11/2003 | Adams .............. | H01M 8/04238 320/101 |
| 2006/0078788 A1* | 4/2006 | Ramschak ......... | G01R 31/3624 429/90 |
| 2007/0172708 A1* | 7/2007 | Takebe .............. | G01R 31/3679 429/431 |
| 2010/0141262 A1* | 6/2010 | Watanabe ......... | H01M 8/04358 324/430 |

FOREIGN PATENT DOCUMENTS

KR 10-1090705 B1 12/2011

* cited by examiner

*Primary Examiner* — Kenneth Douyette
(74) *Attorney, Agent, or Firm* — Mintz Levin Cohn Ferris Glovsky and Popeo, P.C.; Peter F. Corless

(57) ABSTRACT

A failure diagnosis apparatus that includes an alternating current (AC) absorption unit that is connected to the fuel cell stack and switched based on an applied AC signal to enable a current from the fuel cell stack to flow. In addition, an AC signal generator is configured to generate the AC signal and supply the generated AC signal to the AC absorption unit. As the current from the fuel cell stack is absorbed by the AC absorption unit based on an alternating signal, a stack current input into a diagnosis processing unit includes an AC component, thus the diagnosis processing unit may diagnose fuel cell stack failure by analyzing a frequency of the AC component.

7 Claims, 3 Drawing Sheets

APPARATUS FOR DIAGNOSING FAULT OF FUEL CELL STACK

CROSS-REFERENCE TO RELATED APPLICATION

This application claims priority to and the benefit of Korean Patent Application No. 10-2012-0143882 filed in the Korean Intellectual Property Office on Dec. 11, 2012, the entire contents of which are incorporated herein by reference.

BACKGROUND (a) Field of the Invention

The present invention relates to an apparatus for diagnosing a fault of a fuel cell stack.

(b) Description of the Related Art

A fuel cell is a type of battery that directly converts chemical energy generated by oxidation of fuel to electrical energy which can be utilized by any number of devices. For the most part, a fuel cell is identical to a chemical cell in that it uses an oxidation and reduction reaction to produce energy. However, in a fuel cell, reactants are intermittently supplied from an outside source and thus, reaction products are consecutively removed from a fuel cell system. In a chemical cell, however, the battery reaction is performed within a closed system.

Currently, commercialization of the fuel cell has begun to take off because the reaction product of the fuel cell is pure water and thus is very environmentally friendly. Accordingly, research for using fuel cells as an energy source for vehicles is of great interest in the automotive industry.

A fuel cell is often made up of a stack assembly in which a plurality of unit cells are consecutively disposed one on top of/next to the other, which is referred to within the industry as a fuel cell stack. Electrical energy is produced by providing each unit cell of the fuel cell stack with hydrogen as a fuel and oxygen as an oxidizer. However, when performance deterioration or a failure occurs in any one cell among the unit cells that make up the fuel cell stack, the entire performance of the fuel cell stack is deteriorated and thus, a stable operation is not provided.

In the related art, performance of the fuel cell stack is diagnosed by measuring voltage output from each unit cell of the fuel cell stack. Such diagnosis method includes a total harmonic distortion analysis (THDA) method. The THDA method diagnoses cell voltage by calculating a distortion rate through frequency analysis of the stack voltage. Even though the THDA method may easily detect a drop in cell voltage, it is substantially difficult to quantitatively measure what has caused the drop in cell voltage.

However, for the above fault diagnosis, a direct current (DC) to DC (DC-DC) converter that boosts DC voltage and a DC to alternating current (AC) (DC-AC) inverter that converts the boosted DC voltage to AC voltage are required to inject the alternating current into the fuel cell stack. Since both the above converter and inverter are required, a configuration of an apparatus for diagnosing a failure in the fuel cell stack becomes complex and a large number of parts are required. Accordingly, product price increases. Additionally, the fault diagnosis apparatus requires a capacitor that decouples when injecting the alternating current into the direct current. When the alternating current passes the above capacitor, distortion of a signal occurs. Accordingly, it may be difficult to apply the alternating current of sign wave.

The above information disclosed in this section is only for enhancement of understanding of the background of the invention and therefore it may contain information that does not form the prior art that is already known in this country to a person of ordinary skill in the art.

SUMMARY

The present invention provides a fault diagnosis apparatus that may diagnose whether a fuel cell stack has failed using a further simple structure.

An exemplary embodiment of the present invention provides an apparatus that diagnoses a failure in a fuel cell stack, the apparatus including an alternating current (AC) absorption unit connected to the fuel cell stack and switched according to an applied AC signal to enable a current from the fuel cell stack to flow; an AC signal generator configured to generate the AC signal, and to supply the generated AC signal to the AC absorption unit; and a diagnosis processing unit configured to measure stack voltage or a stack current of the fuel cell stack, and to diagnose whether the fuel cell stack has failed based on the measured stack voltage or stack current. The AC signal generator may vary a frequency and amplitude based on a control signal that is output from the diagnosis processing unit to thereby generate the AC signal.

Moreover, the AC absorption unit may include a transistor of which a collector terminal is connected to a first terminal of the fuel cell stack, of which an emitter terminal is connected to a second terminal of the fuel cell stack, and of which a base terminal is connected to an output terminal of the AC signal generator. A load may be connected between the first terminal of the fuel cell stack and the second terminal of the fuel cell stack, and the stack current output from the fuel cell stack may be a summation of an absorption current that flows through the AC absorption unit and a load current that flows through the load.

Another exemplary embodiment of the present invention provides an apparatus that diagnoses a failure in a fuel cell stack, the apparatus including an AC absorption unit connected between both terminals of the fuel cell stack and switched according to an applied AC signal to enable a current from the fuel cell stack to be absorbed and flow; a load unit connected between both terminals of the fuel cell stack and in which the current from the fuel cell stack flows; an AC signal generator configured to generate the AC signal and supply the generated AC signal to the AC absorption unit; and a diagnosis processing unit configured to measure a stack current including an absorption current that flows through the AC absorption unit and a load current that flows through the load unit, to measure stack voltage of the fuel cell stack, and to diagnose whether the fuel cell stack has failed or experienced an error based on the measured stack voltage or stack current.

According to an exemplary embodiment of the present invention, it may be possible to diagnose a failure in a fuel cell stack using a further simple structure. In particular, even though a DC-DC converter and a DC-AC inverter that converts boosted DC voltage to an alternating current are not used, it may be possible to enable a current of the fuel cell stack to have an alternating current. Accordingly, a structure of the fault diagnosis apparatus may become simplified and a relatively small number of parts may be used. Accordingly, production cost of the fault diagnosis apparatus may be reduced.

DETAILED DESCRIPTION

Figure 1:
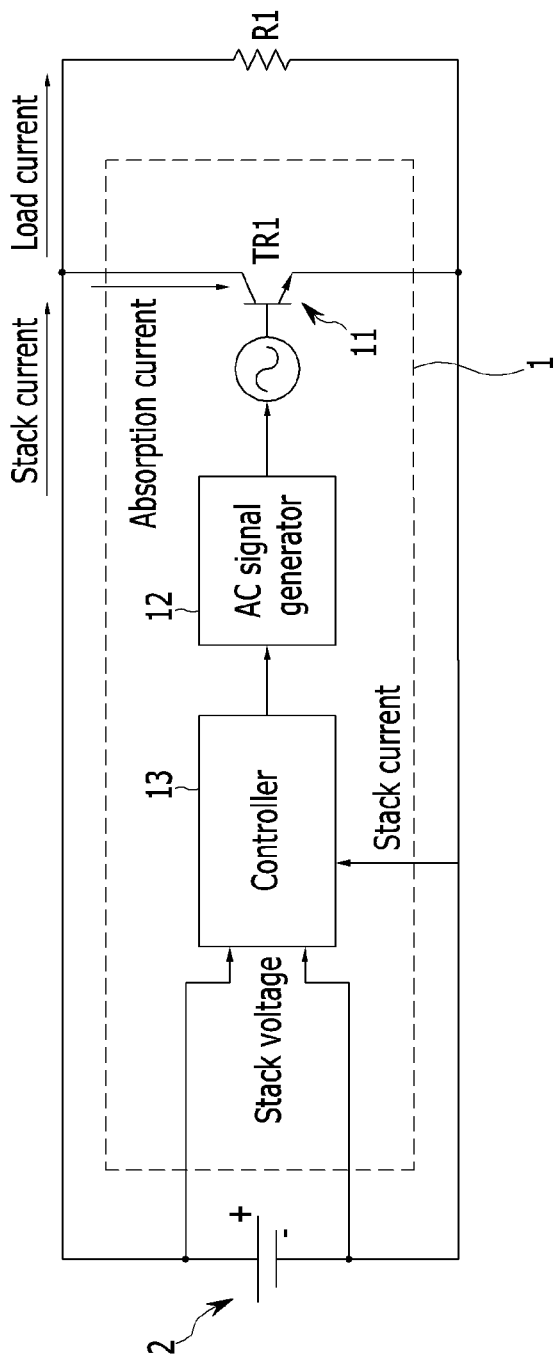
FIG. 1 is an exemplary diagram illustrating a structure of an apparatus that diagnoses a failure in a fuel cell stack according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, only exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise/include" and variations such as "comprises/includes" or "comprising/including", will be understood to imply the inclusion of stated elements but not the exclusion of any other elements.

Hereinafter, an apparatus that diagnoses a failure in a fuel cell stack according to an exemplary embodiment of the present invention will be described with reference to the accompanying drawings. FIG. 1 is an exemplary diagram illustrating a structure of an apparatus that diagnoses a failure in a fuel cell stack according to an exemplary embodiment of the present invention.

As shown in FIG. 1, an apparatus 1 (hereinafter, referred to as "fault diagnosis apparatus 1") that diagnoses a failure in a fuel cell stack 2 according to an exemplary embodiment of the present invention may include an alternating current (AC) absorption unit 11 connected to the fuel cell stack 2, an AC signal generator 12 configured to generate an AC signal that operates the AC absorption unit 11, and a diagnosis processing unit 13 configured to perform a fault diagnosis by measuring voltage and a current of the fuel cell stack 2.

For the failure diagnosis of the fuel cell stack 2, the AC absorption unit 11, connected to the fuel cell stack 2, in which a current output from the fuel cell stack 2 flows, and to enable a stack current to have an AC component, may include a transistor TR1. Moreover, a load unit, that is, a load R1 may be included in or connected to the failure diagnosis apparatus 1, and the load R1 briefly refers to all of the parts that use electricity generated from the fuel cell stack 2. The load consumes power of a fuel cell, and may include, for example, an inverter, a motor, a DC-DC converter, a battery, and the like.

A collector terminal of the transistor TR1 may be connected to a first terminal (e.g., +terminal) of the fuel cell stack 2, an emitter terminal may be connected to a second terminal (e.g., −terminal) of the fuel cell stack 2, and a base terminal may be connected to an output terminal of the AC signal generator 12. A terminal on a first side of the load R1 may be connected to the first terminal of the fuel cell stack 2, and a terminal on a second side of the load R1 may be connected to the second terminal of the fuel cell stack 2. Accordingly, the stack current output from the fuel cell stack 2 may flow through the transistor TR1 and through the load R1. A current that flows through the transistor TR1 is referred to as an absorption current, and a current that flows through the load R1 is referred to as a load current.

Figure 2:
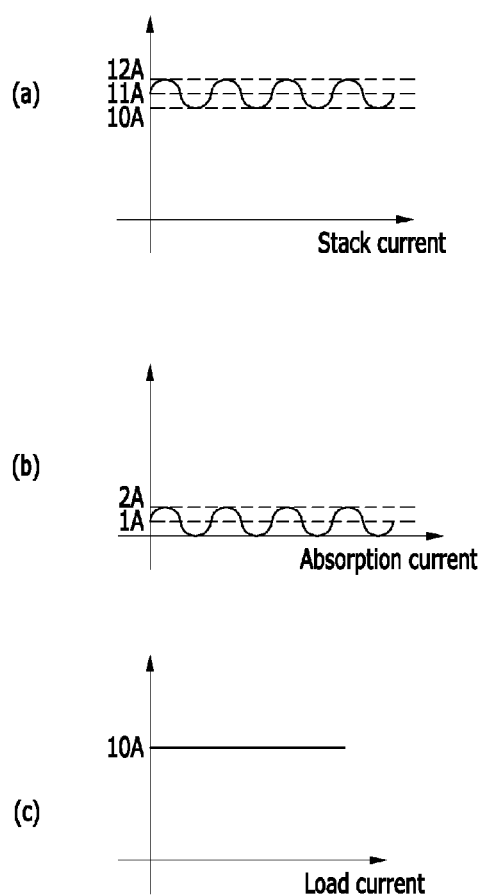
FIG. 2 is an exemplary graph illustrating a characteristic of a stack current according to an exemplary embodiment of the present invention.

FIG. 2 is an exemplary graph illustrating a characteristic of a stack current according to an exemplary embodiment of the present invention. The absorption current may have an AC component according to a switching operation of the transistor TR1 as shown in FIG. 2(b), and the load current may have a DC component as shown in FIG. 2(c). The stack current output from the fuel cell stack 2 according to an operation of the transistor TR1 may flow through the transistor TR1 and thereby becomes an AC component. Accordingly, as shown in FIG. 2(a), the stack current may be expressed as a summation of the load current and the absorption current.

The AC signal generator 12 may be configured to generate an AC signal (or may also be referred to as a driving current)

that drives the transistor TR1 of the AC absorption unit 11, and may be configured to output the generated AC signal to the base terminal of the transistor TR1. The AC signal may enable the stack current to be expressed as an AC component even with a substantially small amount of power. A current that flows in the transistor TR1 may be a current of an amplification area of the transistor TR1. Accordingly, compared to the current applied to the base terminal, a current amplified by an amplification rate flows.

The AC signal generator 120 may be configured to generate an AC signal according to a control signal output from the diagnosis processing unit 13. The diagnosis processing unit 13 may be configured to adjust a frequency of the current output from the AC signal generator 12 according to the control signal. The AC signal supplied to the transistor TR1 of the AC absorption unit 11 may be expressed as $I_{text}=I_{max} \times \sin \omega t$. Frequency ω varies according to the control signal. The AC signal generator 12 may be configured to generate an AC signal of 10 Hz according to, for example, the control signal output from the driving current control unit 131, and may be configured to supply the generated AC signal to the AC absorption unit 11.

As described above, since the current of the fuel cell stack 2 is required to only flow through the transistor TR1 of the AC absorption unit 11, an amount of power to be injected into the fuel cell stack 2 may not be required. The AC signal input into the base terminal of the transistor TR1 is required to flow only in a form of a sinusoidal waveform and thus, a configuration of the failure diagnosis apparatus 1 may be simplified and a the number of parts used may decrease. In addition, instead of injecting an alternating current into a direct current, the alternating current may flow directly in the transistor TR1 and thus, a decoupling capacitor may not be required. Accordingly, a distortion of the alternating current may not occur and thus, it may be possible to enable the alternating current close to a sinusoidal waveform to flow.

Meanwhile, the diagnosis processing unit 13 may be configured to measure stack voltage and/or stack current of the fuel cell stack 2, and diagnose whether the fuel cell stack 2 has failed based on the measured stack voltage and/or stack current. Further, an operation of an apparatus that diagnoses a failure in a fuel cell stack according to an exemplary embodiment of the present invention will be described based on the above structure.

To diagnose the failure in the fuel cell stack 2, the failure diagnosis apparatus 1 may be configured to generate an alternating current of a predetermined frequency and supply the generated alternating current to the AC absorption unit 11. As an AC signal of a predetermined frequency, for example, 10 Hz output from the AC signal generator 12 is supplied to the transistor TR1 of the AC absorption unit 11, the transistor TR1 may be configured to perform a switching operation of being turned on or turned off and the stack current output from the fuel cell stack 2 may flow through the AC absorption unit 11. Additionally, the stack current may flow through the load R1.

Accordingly, as shown in FIG. 2, the stack current input into the diagnosis processing unit 13 may include an absorption current of an AC component that flows through the transistor TR1 and a load current of a DC component that flows through the load R1. The diagnosis processing unit 13 may be configured to measure stack voltage and a stack current, and diagnose a failure in the fuel cell stack 2 based on the measured stack voltage and stack current. For example, the diagnosis processing unit 13 may be configured to measure the stack voltage, calculate a distortion rate based on the measured stack voltage, and diagnose a failure in the fuel cell stack 2 based on the calculated distortion rate. A total harmonic distortion analysis (THDA) may be used as a method of calculating the distortion rate.

Figure 3:
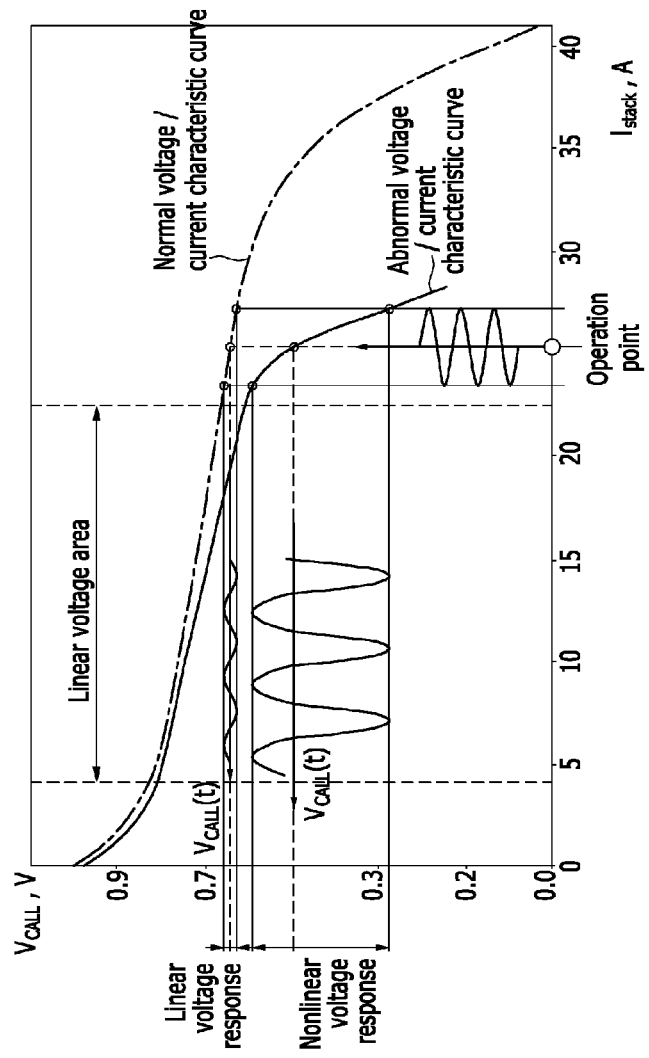
FIG. 3 is an exemplary graph illustrating a characteristic of a voltage current according to an operation state of each cell of a fuel cell stack according to an exemplary embodiment of the present invention.

FIG. 3 is an exemplary graph illustrating a characteristic of a voltage current according to an operation state of each cell of a fuel cell stack.

In general, when supplying a current of a sinusoidal waveform to the fuel cell stack 2, voltage of a cell that operates normally (e.g., no error) in the fuel cell stack 2 may vary in a linear section as indicated by a dotted line of FIG. 3, and voltage of a cell that operates abnormally (e.g., with error) in the fuel cell stack 2 may vary in a nonlinear section as indicated by a solid line of FIG. 3. Accordingly, voltage of a normal cell may have a decreased distortion according to a change in the current, whereas voltage of an abnormal cell may have an increased voltage amplitude and an increased distortion based on a change in a cell current. Accordingly, it may be possible to diagnose a failure in the fuel cell stack 2 by calculating a distortion rate using frequency analysis of the stack current and diagnosing whether the cell voltage has dropped based on the calculated distortion rate. As one example of the above failure diagnosis method, other methods (e.g., a method of measuring impedance based on the stack voltage and the stack current, and thereby diagnosing failure in the fuel cell stack 2) may be used.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. An apparatus that diagnoses a failure in a fuel cell stack, the apparatus comprising:
    an alternating current (AC) absorption unit connected to the fuel cell stack and switched based on an applied AC signal to enable a current from the fuel cell stack to flow;
    an AC signal generator configured to generate the AC signal and supply the generated AC signal to the AC absorption unit; and
    a processor configured to:
        measure stack voltage or a stack current of the fuel cell stack; and
        diagnose the failure in the fuel cell stack based on the measured stack voltage or stack current.

2. The apparatus of claim 1, wherein:
    the AC signal generator varies a frequency and an amplitude based on a control signal output from the diagnosis processing unit to generate the AC signal.

3. The apparatus of claim 1, wherein the AC absorption unit includes:
    a transistor wherein a collector terminal is connected to a first terminal of the fuel cell stack, an emitter terminal is connected to a second terminal of the fuel cell stack, and a base terminal is connected to an output terminal of the AC signal generator.

4. The apparatus of claim 3, wherein:
    a load is connected between the first terminal of the fuel cell stack and the second terminal of the fuel cell stack, and the stack current output from the fuel cell stack is a summation of an absorption current that flows through the AC absorption unit and a load current that flows through the load.

5. An apparatus for diagnosing a failure in a fuel cell stack, the apparatus comprising:
an alternating current (AC) absorption unit connected between both terminals of the fuel cell stack and switched based on an applied AC signal to enable a current from the fuel cell stack to be absorbed and flow;
a load unit connected between both terminals of the fuel cell stack and in which the current from the fuel cell stack flows;
an AC signal generator configured to generate the AC signal and supply the generated AC signal to the AC absorption unit; and
a processor configured to:
measure a stack current including an absorption current that flows through the AC absorption unit and a load current that flows through the load unit;
measure stack voltage of the fuel cell stack; and
diagnose the failure in the fuel cell stack based on the measured stack voltage or stack current.

6. The apparatus of claim 5, wherein the AC absorption unit includes:
a transistor, wherein a collector terminal is connected to a first terminal of the fuel cell stack, an emitter terminal is connected to a second terminal of the fuel cell stack, and a base terminal is connected to an output terminal of the AC signal generator.

7. A method of operating a fuel cell stack failure diagnosis apparatus, the method comprising:
generating, by an alternating current (AC) signal generator, a driving current of a predetermined frequency;
measuring, by a processor, a stack voltage and a stack current based on the generated driving current;
calculating, by the processor, a distortion rate based on the measured stack voltage;
adjusting, by the processor, a frequency of the stack current based on a control signal;
diagnosing, by the processor, a failure in the fuel cell stack based on the calculated distortion rate.

* * * * *